Nov. 5, 1963   H. E. BALSIGER ET AL   3,109,269
SWIVEL INDICATOR

Filed May 19, 1960   3 Sheets-Sheet 1

R. E. PRICE and
H. E. BALSIGER
INVENTORS

Nov. 5, 1963 H. E. BALSIGER ET AL 3,109,269
SWIVEL INDICATOR
Filed May 19, 1960 3 Sheets-Sheet 2
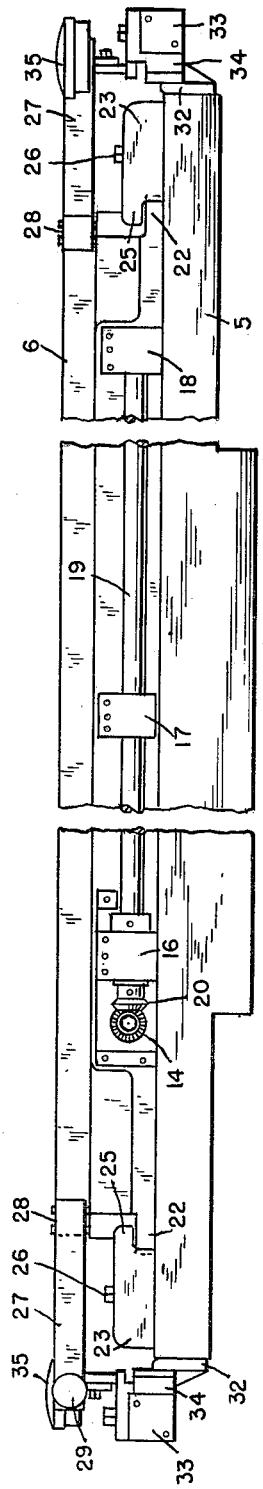
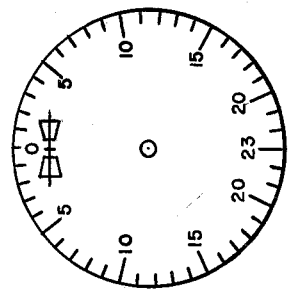
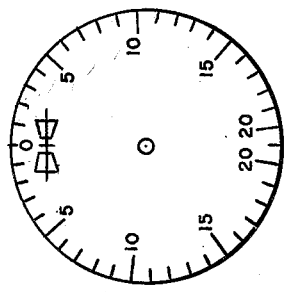
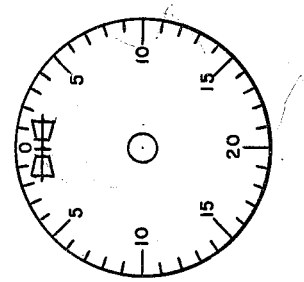
R. E. PRICE and
H. E. BALSIGER
INVENTORS
BY *Mason, Porter, Miller & Stewart*
ATTORNEYS

United States Patent Office 3,109,269
Patented Nov. 5, 1963

3,109,269
SWIVEL INDICATOR
Harold E. Balsiger and Ralph E. Price, Waynesboro, Pa.,
assignors to Landis Tool Company, Waynesboro, Pa.
Filed May 19, 1960, Ser. No. 30,264
2 Claims. (Cl. 51—240)

The following specification relates to an indicator for a swivel table forming part of a machine tool such as a cylindrical grinding machine.

The angular adjustment of the swivel table relative to the work carriage of a grinding machine or the like, is an essential function in setting up the machine for a particular job. The purpose of this adjustment is to assure either straightness of the workpiece or a specific degree of taper.

Ordinarily this adjustment or correction necessitates the use of electric measuring circuits or manual adjustment by trial and error. The electric device is expensive. The trial and error method is time consuming. An indicator at one end of the table gives no assurance that the other end is properly positioned.

An object of the invention is to provide for ready removal of the indicating gauges from one position to another.

An important object of the invention is to provide independent indications or readings of the extent of swiveling desired at opposite ends of the swivel table to eliminate the factor of possible strain which may develop in the table.

An incidental object of the invention is to provide a manual control for the swivel adjustment relative to the indicator from each end of the work carriage.

With the electronic-type swivel indicator, in order to accommodate the graduations of the indicating device for various lengths of work, provision is made to measure work diameters between specifically defined measuring points. The spacing between said points would be less than the length of the workpiece and would be the same for all workpieces within a given range.

It is an object of this invention to provide means whereby the measuring points of any workpiece are its ends.

Another object is to provide means for determining the space between graduations so that each graduation will reflect a taper, for example, of .00001 per inch of length of a workpiece regardless of the length of the workpiece.

Another object is to provide indicators calibrated according to distance of the indicators from the swivel point of the table.

As illustrating the preferred form of the invention we have shown it on the accompanying drawings in which:

FIG. 2 is a side elevation of the same;

FIG. 3 shows a representative dial face where the swivel table is pivoted at its mid-point;

FIG. 4 shows a representative left dial face where the swivel pivot point is left of center;

FIG. 5 shows the corresponding right dial face, and

Figure 1:
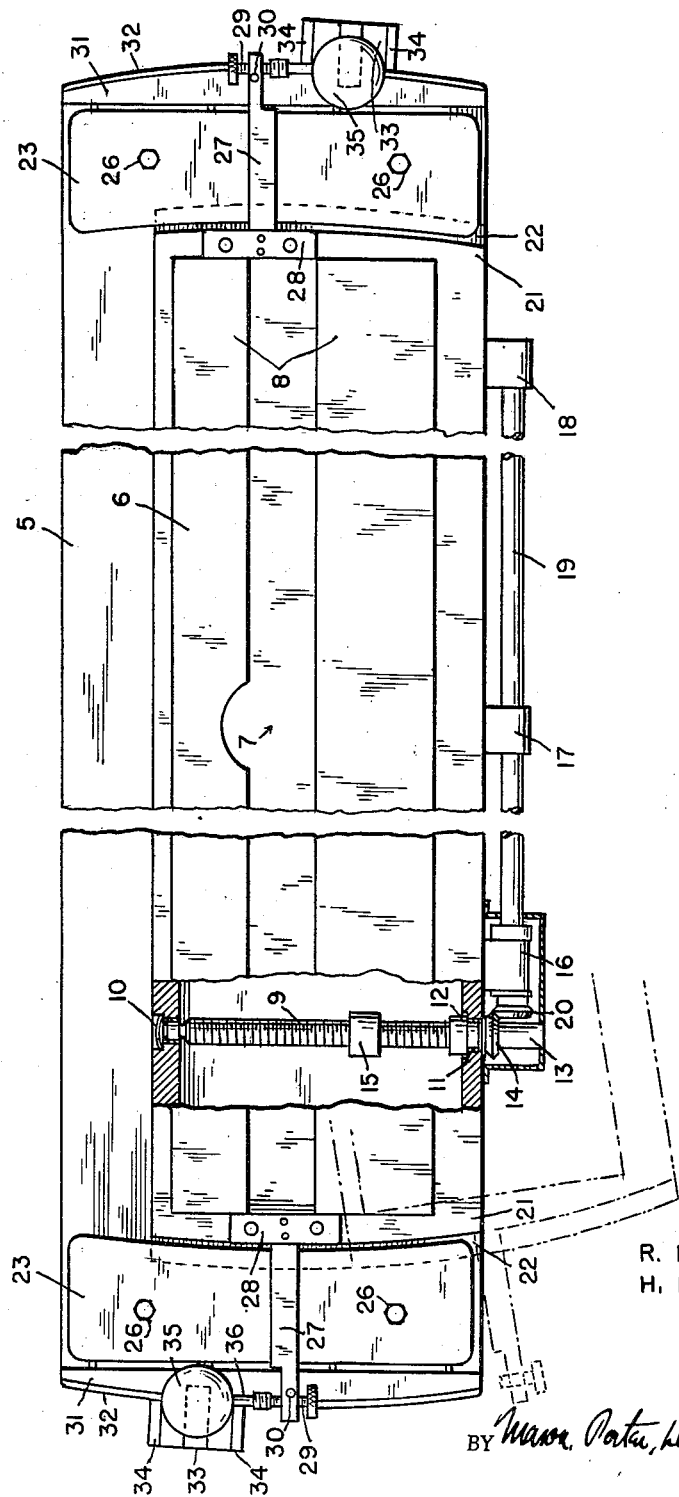
FIG. 1 is a top plan view of the gauges as provided for use with a swivel table and a work carriage.

Briefly described, the invention consists in the provision that each end of the swivel table has an extension arm, each provided with an adjustable screw or stop. Cooperating with this adjusting screw, there is a dial indicator that is mounted on the end of the carriage and in the path of the adjusting screw. The gauge or dial indicator is removably and selectively attached to the end of the carriage by a magnetically operated bracket, so that the indicator may be shifted quickly from one position to another without having to bother with clamping screws or the like.

An arm on the end of the table extends into a position to engage and actuate said indicator.

Thus there is provided the usual work carriage 5 and a cooperating swivel table 6. The swivel table is slidably mounted on the carriage 5 around a pivotal point 7. This pivotal point may be midway between the ends of the carriage 5 or if special circumstances require, may be located near one end of the table. The table has spaced finished surfaces 8 upon which the ordinary headstock and tailstock, not shown, are mounted to carry the workpiece.

The carriage is provided with an adjusting screw 9. This adjusting screw has a sleeve bearing 10 at one end covered with the usual dust cap. The opposite side of the carriage 5 also has a sleeve bearing 11. Adjacent the sleeve bearing 11 is a thrust collar 12 which along with miter gear 14 prevents the screw from moving axially.

For longer carriages, a screw 9 may be used at each end of the carriage. The adjusting procedure with two screws is substantially the same as just for one screw. One screw is adjusted until the indicator at that end reads zero. That end of the carriage is then clamped. The screw at the other end is then adjusted until the indicator reads zero and that end of the carriage is then clamped.

The screw 9 has an extension 13 outside the front wall of the carriage. This extension carries the miter gear 14.

A screw threaded nut 15 is pivotally mounted on the bottom surface of the swivel table 6 and fitted around the screw 9.

Suitable bearings 16, 17 and 18 extend in alignment along the adjacent side of the carriage and carry a control shaft 19. This shaft 19 has a miter gear 20 in mesh with gear 14. Both the extension 13 and the free end of the shaft 19 are provided with a socket which may be square, hexagonal or otherwise adapted to receive a crank handle, not shown. This arrangement enables the operator to actuate the adjusting screw from positions close to both of the indicators so that he may watch the indicator with which he is concerned, while making the adjustment.

The table 6 has arcuate ends 21, 21 centered upon the pivotal point 7. Each end carries a graduated scale by which the angular extent of the swiveling is indicated.

There is a ledge 22 forming an extension of each end 21, 21.

The carriage is provided at each end with a clamping plate 23, 23. These clamping plates are fastened by bolts 26 or otherwise to the carriage near the ends of the swivel table.

The inner edge of each plate 23, 23 is arcuate centered upon the pivot point 7. The edge terminates in an overhanging ledge 25.

Each clamping plate 23, 23 is provided with a headed bolt 26 by which the ledge 25 of the clamping plate 23 may be brought down against the ledge 22 of the swivel table and thus anchor the latter in adjusted angular position upon the carriage 5.

The swivel table 6 is provided at each end with an arm 27 which extends longitudinally beyond the end of the swivel table. This arm is rigidly attached by means of a bracket 28 to the swivel table 6. The end of the arm is bifurcated and horizontally drilled and screw-threaded to receive an adjusting screw 29 having a knurled head or the like. A set screw 30 constricts the sides of the end of the arm 27 and thus locks the adjusting screw 29 in the desired position.

The carriage 5 has curved ends 31, 31. These also are arcs centered upon the pivotal point 7. Each end 31 has a track 32 of magnetically permeable material, such as iron or steel.

A bracket 33 is provided having opposite magnetic end plates 34, 34.

The brackets 33 each carry an indicator 35 having a dial and a feeler 36. This feeler is in line with the adjusting screw 29. The number and spacing of the graduations on the dial of indicator 35 depend on the position of the table swivel point relative to the ends of the table. If the swivel point is in the center of the table, both dials will be the same. If the swivel point is not in the center of the table, the number and spacing of the graduations must be determined in accordance with the distance of the swivel point from each end of the table.

The spacing between graduations and thus the total number of graduations will vary in accordance with the distance between the indicator and the center about which the table is swivelled.

The number of graduations on the indicator dial for a given distance from swivel point to indicator may be determined by the equation $$N = \frac{A}{GL}$$

where:

A is the taper measured by one revolution of the indicator hand (in this case, the standard indicator reads ten thousandths per revolution of the indicator hand),
G is the desired taper per inch for each graduation on the indicator dial, in this case, .000005",
L is the distance from the swivel center to the point of contact with the indicator, and
$A/L$ is the unit of taper per inch of length.

It may be desirable at times to use indicators showing more or less than ten thousandths per revolution.

The above formula applies regardless of different values of A and G, for example, (1) $$N = \frac{.010}{.00005 \times 50} = 40$$

(2) $$N = \frac{.00004}{.000001} = 40$$

The indicator shown in FIG. 3 is based on these figures and shows twenty graduations in each direction from zero or a total of 40 graduations.

At the top of each indicator dial are two figures representing tapered workpieces with the taper of one opposite to that of the other. The arrows in each figure point in opposite directions and indicate the direction in which the indicator hand should be set by screw 29 in order to correct a taper corresponding in direction to one or the other of the figures.

FIGURES 4 and 5 show the dials of the left hand and right hand indicators respectively where the swivel point is not in the center of the table. In FIGURE 3, each half of the indicator is divided into 21 parts while in FIGURE 4, each half of the indicator is divided into 23 parts. However, if it is desired to adjust the table to a taper of ten millionths per inch, each indicator would be set with the indicator hand on the first graduation in a direction depending on the direction of taper. Then the table is moved until both indicators read zero even though actually, the longer end of the table is moved farther than the shorter end.

In operation the swivel table is positioned as usual using the graduated swivel scale mounted on the swivel table. A workpiece is then ground to test the extent to which the swivel table produces the desired taper on the work. There is frequently some slight error which must be further adjusted for. The dial indicator which is magnetically attached to the track is set to indicate the amount of adjustment or correction required to produce either a straight piece or one having a specific taper. The magnetically mounted indicator is shifted to a position in which the feeler is in engagement with the adjusting screw 29. The setting of the indicator is effected either by turning the adjusting screw or the indicator dial so that the indicator reads the amount and direction of the error in the work. However, in this case, it is preferred to use the adjusting screw and to make the indicator dials fixed. In this way, the zero point is always in position to be easily read by the operator.

After finding the error in the trial grind, the setting of the dial indicator may be determined in terms of the number of graduations from zero by the following formula: The number of $$\text{graduations} = \frac{\text{number of tenths difference in diameter} \times 10}{\text{distance between measuring points in inches}}$$

For example: .0012" difference in diameters at 15" measuring points number of $$\text{graduations} = \frac{12 \times 10}{15} = 8$$

This setting is repeated at the opposite end of the carriage and swivel table. With the clamping members 23 released, the swivel table is moved by means of screw 9 so that the indicator approaches a zero reading. Adjustment of the table continues until the indicator at the end of the table opposite the adjusting screw 9 reads zero. That end of the table is then clamped. If the indicator at the other end also reads zero, the other end of the table is also clamped and the machine is ready for grinding. If the second indicator does not read zero, due to deflection of the table, etc. screw 9 should be turned to shift the table in the direction to obtain a zero reading on the indicator. This end of the table is then clamped.

By the use of this construction, a swivel indicator is provided which is readily applied and detached. It requires no use of electrical devices in order to obtain a very accurate and precise reading and adjustment. The indicator is operable over the entire range of angular movement of the swivel table, beause the magnetic mounting permits shifting said indicator from one position to another without the need for manipulating a mechanical fastening device. By duplicating the indicators at opposite ends of the table, compensation can be made for possible strain upon the latter.

Figure 6:
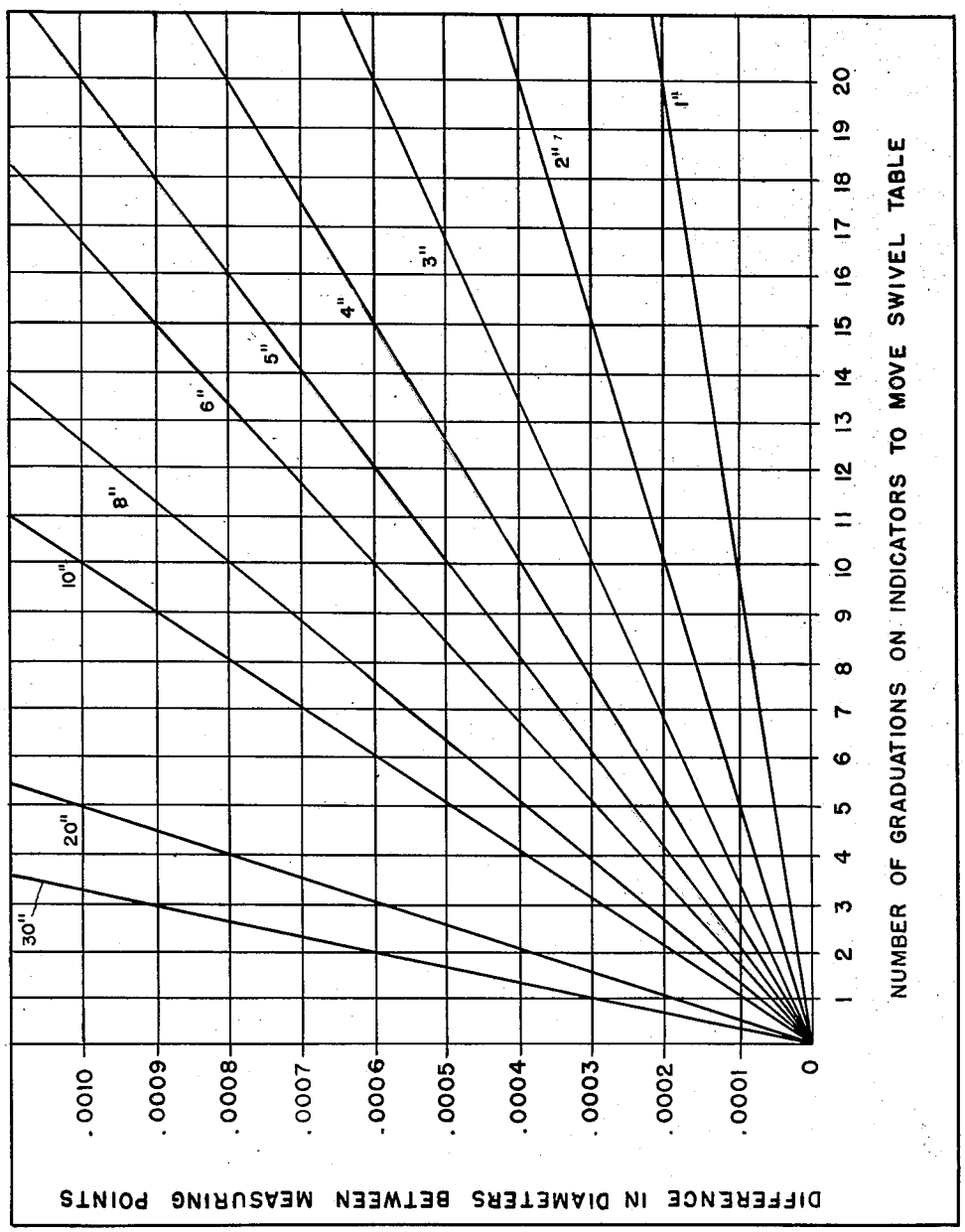
FIG. 6 is a graphical scale for setting the indicators.

The chart shown in FIG. 6 is based on the above formula and makes possible a quick determination of the number of graduations for correcting a particular condition.

In this chart, the vertical scale represents a range of differences in diameter between measuring points on a workpiece.

The horizontal scale of the chart shows the number of graduations to which the indicator must be set for a given difference in diameter and distance between measuring points.

The inclined lines on the chart represent the different distances between measuring points on a workpiece. Each line represents the minimum length workpiece for which the line may be used. For example, the line marked 10" may be used on workpieces 10" and over.

A horizontal line representing a particular difference in diameter is followed to the inclined line representing the distance between measuring points.

The vertical line at which the horizontal and inclined lines intersect is then followed to determine the number of graduations from 0 at which the indicator hand is to be set. If the difference in diameter is one thousandth and one or more ten thousandths, the horizontal line representing the number of ten thousandths is followed to the inclined line representing the selected distance between measuring points, and the vertical line at which the horizontal and inclined lines intersect is followed to find the number of graduations corresponding to the number of thousandths. The horizontal line representing the number of ten thousandths over one thousandth is then followed to the same inclined line representing the distance between measuring points. The vertical line through the intersection of the selected horizontal and inclined lines indicates the number of graduations corresponding to the number of ten thousandths over one thousandth. The number of graduations for one thousandth and the number of graduations for ten thousandths are added to determine the setting of the indicator hand.

If it is desired to use the exact length of the workpiece rather than the measuring points listed on the chart, the above formula may be used to determine the number of graduations to set on the dial for that particular length.

The construction is applicable to a large variety of machine tools already installed or being newly designed.

The essential features of the invention have been shown and described in the above specification by way of example and without limitation beyond the scope set out in the following claims.

What we claim is:

1. In combination, a work carriage for a cylindrical grinder and the like, a swivel table pivotally mounted on said carriage, means for turning said table on said pivot comprising an adjusting screw at one end of said table, a track on each end of said carriage, an arm extending longitudinally from each end of said table, a bracket magnetically attached to one track on one side of one arm, a bracket attached to the other track on the opposite side of the other arm, an indicator mounted on each bracket opposite the adjacent arm, means for clamping said end of the table opposite said screw to said carriage after adjustment of said table to a predetermined position as shown by the related indicator and means to clamp the opposite end of the table after the screw has shifted the said table end until the related indicator conforms to the opposite indicator.

2. In combination, a work carriage for a cylindrical grinder or the like, a swivel table pivotally mounted on said carriage, a transverse adjusting screw mounted in one end of said carriage, a nut carried by said table in operative relation with said screw, an indicator actuating means on each end of said table, an indicator attached to one end of said carriage on one side of the adjacent actuating means, an indicator attached to the other end of the carriage on the opposite side of the adjacent actuating means, a clamp for holding the end of said table opposite said screw in a predetermined adjusted position effected by said screw, said screw being operable thereafter to shift the other end of said table until the corresponding indicator shows that any deflection has been corrected, a clamp on the carriage for holding said table end as corrected in deflection and means at each end of the table to actuate said screw.

References Cited in the file of this patent
UNITED STATES PATENTS

| | | |
|---|---|---|
| 2,539,506 | Bura | Jan. 30, 1951 |
| 2,702,970 | Haverstick | Mar. 1, 1955 |
| 2,769,282 | Wood | Nov. 6, 1956 |
| 2,780,040 | Goehring | Feb. 5, 1957 |
| 2,880,407 | Comstock | Mar. 31, 1959 |

FOREIGN PATENTS

| | | |
|---|---|---|
| 925,721 | France | Sept. 11, 1947 |

OTHER REFERENCES

Popular Mechanics for March 1959; page 208. (Copy in Scientific Library.)